United States Patent [19]
Landvatter

[11] 3,923,175
[45] Dec. 2, 1975

[54] HITCH FOR PORTABLE CONVEYOR

[76] Inventor: Henry W. Landvatter, 3000 Barrett Station Road, Kirkwood, Mo. 63122

[22] Filed: July 22, 1974

[21] Appl. No.: 490,683

[52] U.S. Cl. ............... 214/509; 193/4; 214/83.26
[51] Int. Cl.² ............................................. B60P 1/36
[58] Field of Search ........ 214/508, 509, 83.26, 520, 214/521, 522; 280/492, 493, 494, 462, 467; 193/4, 5, 6

[56] References Cited
UNITED STATES PATENTS

| | | | |
|---|---|---|---|
| 1,557,841 | 10/1925 | Holmes | 280/494 |
| 2,636,628 | 4/1953 | Prang | 214/83.26 X |
| 2,665,144 | 1/1954 | Birdwell | 280/462 |
| 3,521,767 | 7/1970 | Rossi | 214/83.26 |

FOREIGN PATENTS OR APPLICATIONS

| | | | |
|---|---|---|---|
| 900,930 | 7/1962 | United Kingdom | 280/494 |

Primary Examiner—Albert J. Makay
Attorney, Agent, or Firm—Cohn, Powell & Hind

[57] ABSTRACT

This dump truck and portable conveyor hitch includes a pair of hingedly connected plates, one being pivotally connected to the conveyor, and the other being connected to the dump truck by means of a link member extending between the hinge and the truck. The link member is pivotally connected to both the hinge and the truck to permit the conveyor to be rotated about a shifting vertical pivot axis so that the hitch end of the conveyor can be maintained substantially under the dump truck discharge hatch to compensate for the side angling of the conveyor relative to the truck.

The conveyor can be locked in specific side angled positions relative to the dump truck and can be rotated about its own axis and held in a horizontal position to compensate for lateral tilting of the truck.

7 Claims, 9 Drawing Figures

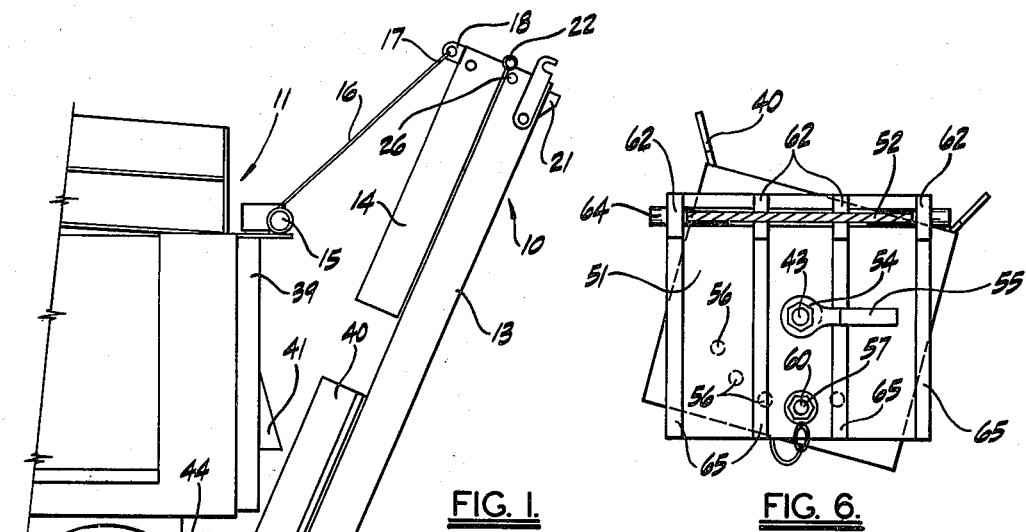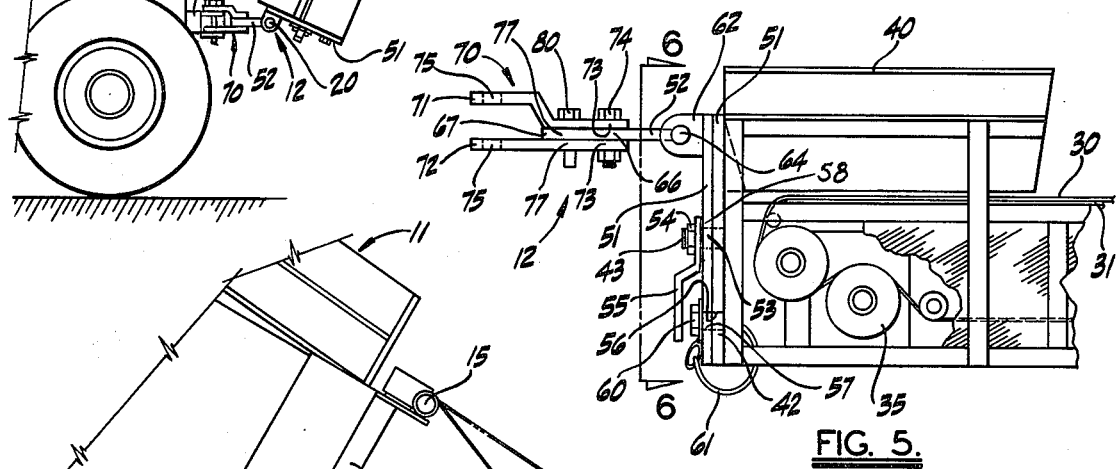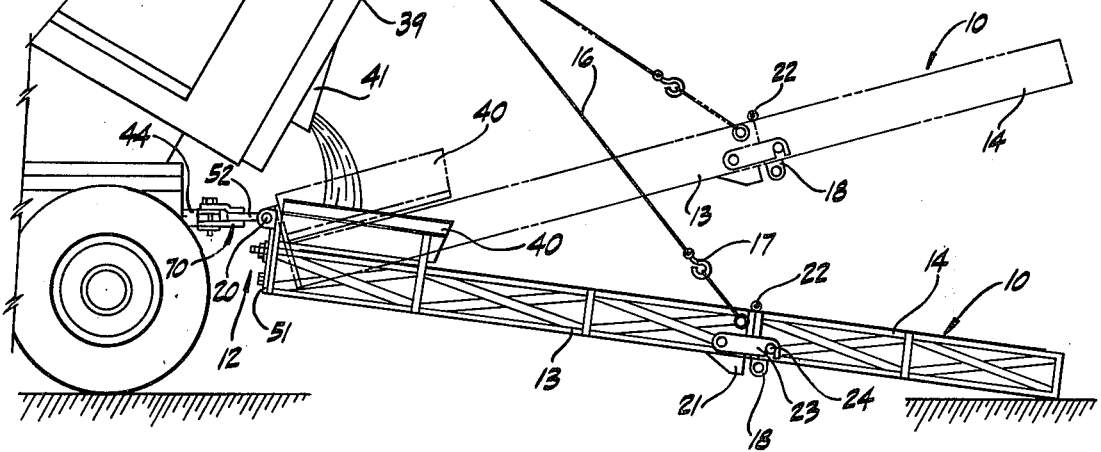

HITCH FOR PORTABLE CONVEYOR

BACKGROUND OF THE INVENTION

This invention relates to portable conveyors for discharging material from a dump truck and particularly to an improved hitch means between the conveyor and the truck.

The discharge of materials, such as gravel and the like, directly from a dump truck presents several problems. For example, because of the bulk of the truck it is frequently impossible to move it to the most convenient discharge station. Thus, it is common to dump the material at a particular location and move it by wheelbarrow or the like closer to the point at which it is needed. Further, conventional dump trucks suffer from the disadvantage that they cannot deposit material at an elevation higher than the discharge hatch. Chutes of various kinds have been used in an effort to solve these problems. However, known hitch connections between the dump truck and the chutes have not proven adequate to provide the chutes with sufficient articulation to direct the material accurately and rapidly from the truck to a particular discharge station. One of the reasons for this inadequacy is that the hitches, in general, provide movement of the chute in the horizontal plane about a single pivot point with the result that the hitch end of the chute receiving the material from the discharge hatch tends to move away from the discharge hatch when the chute is angled. In addition, no suitable means is provided to compensate for the lateral tilting of the chute when the truck is on uneven ground, with the result that the material tends to fall off the chute.

The present hitch provides an improved connection which overcomes these and other problems in a manner not disclosed by the known prior art.

SUMMARY OF THE INVENTION

This improved hitch between a portable conveyor and a dump truck provides for substantially universal movement of the conveyor so that material may be readily deposited at a specific location at some distance from the truck.

The improved hitch permits the conveyor to be angled about a vertical pivot axis below the discharge hatch and at the same time to be shifted so that the conveyor tends to remain within the range of the discharge hatch.

The hitch provides for pivotal movement of the conveyor about its longitudinal axis to compensate for the lateral tilting of the conveyor which would otherwise result when the truck is parked on a lateral slope.

The hitch is provided with locking means for locking the side angling movement of the conveyor relative to the truck and for locking the conveyor against rotational movement about its own longitudinal axis.

This improved hitch is relatively simple and inexpensive to manufacture and can be operated with a minimum of instruction.

It is an important object of this invention to provide a hitch means between a portable conveyor and a dump truck, said conveyor having a hitch attachment means defining a longitudinal pivot axis, and said dump truck having a hitch attachment means defining a generally vertical pivot axis.

It is another important object of this invention to provide hitch means including first and second hingedly connected plates; pivot means connecting and holding said first hinge plate to the conveyor hitch attachment means; and a link member extending between and pivotally connecting the second hinge plate and the truck hitch attachment means.

A further object is to provide a link member having first and second parallel pivot axes and associated first and second pivot connection means said first pivot means connecting the link member to the second hinge plate for relative rotational movement of the link member about the first pivot axis and said second pivot means connecting the link member to the truck hitch attachment means for rotational movement of said link member about the second pivot axis whereby said conveyor can be rotated and laterally shifted to maintain the conveyor hopper under the truck discharge hatch.

Yet another object is to provide locking means selectively locking the second hitch plate against rotation about said first pivot axis, said locking means including a locking pin carried by said link member and disposed in spaced relation from said first pivot axis and said pin being selectively insertable within one of a plurality of apertures in the second hinge plate arcuately disposed about said first pivot axis and to provide stop means limiting rotation of the link member about the second pivot axis.

Still another object is to provide said pivot and holding means between the first hinge plate and the conveyor with means holding said conveyor at an angle of rotation about its longitudinal axis relative to the first hinge plate so that the conveyor can be adjusted to compensate for lateral tilting of the truck.

Another object is to provide a cable connection between the truck and the conveyor having a transversely variable connection to the conveyor to hold the conveyor at a desired angle of tilt relative to the truck.

It is another object to provide locking means between said first hinge plate and said conveyor provided at least in part by a friction clamp pivot connection between said plate and said conveyor hitch attachment means.

A further object is to provide the conveyor hitch attachment means with an end plate fixed to the conveyor and disposed in face-to-face relation with said first hinge plate, one of said hinge and end plates including a fastener means extending between the plates to provide the pivot means and one of the plates including a plurality of apertures disposed in arcuate relation about said pivot axis and said locking means between said first hinge plate and said conveyor hitch attachment means including a locking pin extending from one of said plates into one of said arcuately disposed apertures.

BRIEF DESCRIPTION OF THE DRAWINGS

FIG. 1 is an elevational view illustrating the conveyor in the raised and folded transporting condition;

FIG. 2 is a similar view illustrating the conveyor in unfolded operational conditions;

FIG. 5 is an enlarged detail of the hitch end of the conveyor;

FIG. 6 is a sectional view taken on line 6—6 of FIG. 5;

3,923,175

Figure 7:
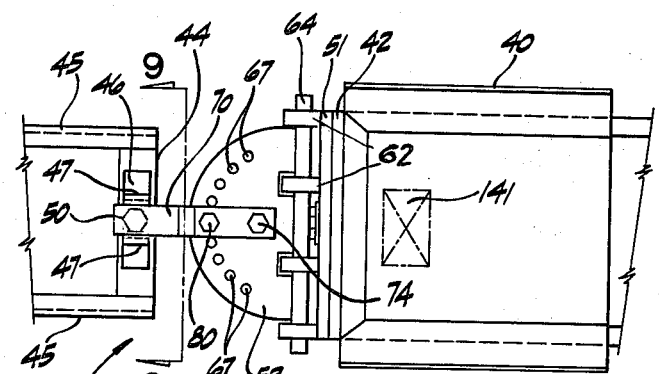
Figure 8:
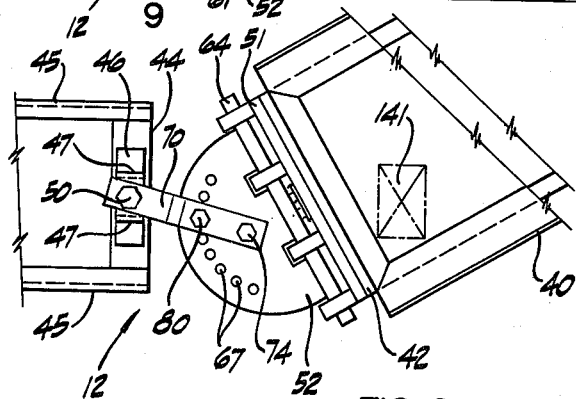
Figure 9:
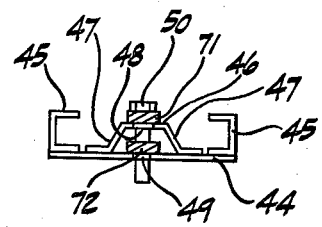

FIG. 7 is an enlarged fragmentary plan view showing the disposition of the hitch link when the conveyor is in a neutral position generally longitudinally aligned with the truck;

FIG. 8 is a similar view to FIG. 7 illustrating the conveyor angled to one side and laterally offset relative to the truck; and FIG. 9 is a sectional view taken on line 7—7 of FIG. 5.

DESCRIPTION OF THE PREFERRED EMBODIMENT

Referring now by characters of reference to the drawings and first to FIG. 1 it will be understood that the conveyor 10 is attached to the end of a dump truck 11 by a hitch means generally indicated by numeral 12. The conveyor 10 of the preferred embodiment is made up of hingedly connected inner and outer sections 13 and 14 respectively. The outer section 14 is folded against said inner section 13 for transportation as shown in FIG. 1 and unfolded during operation as shown in FIG. 2. The conveyor is held in the raised position by means of an electric winch 15, which provides a cable 16 having a hook 17 attached to an eye 18 on the conveyor outer section 14.

Figure 3:
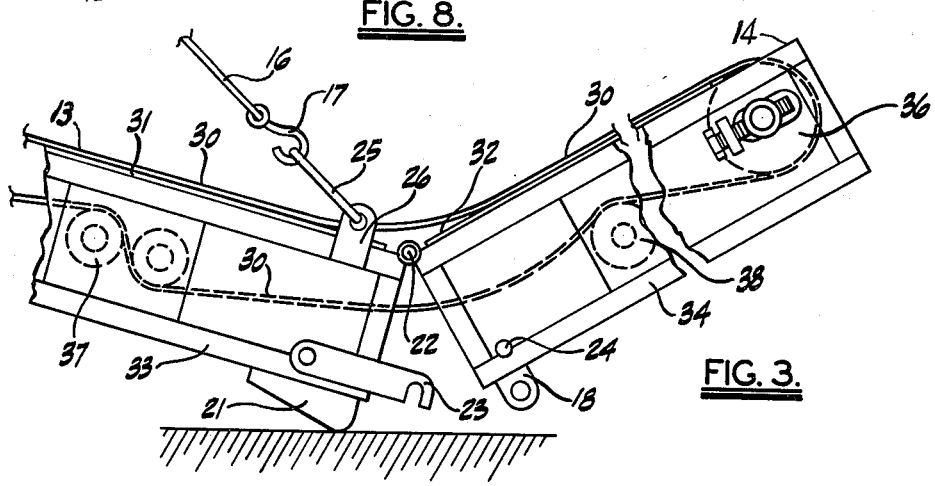
FIG. 3 is an enlarged fragmentary elevational view illustrating the unfolding of the conveyor.

When it is desired to discharge material from the truck 11 at a jobsite, the folded conveyor must first be lowered, by rotation about the hitch hinge axis indicated by numeral 20, until a foot 21 provided at the end of the conveyor section 13 engages the ground. When the conveyor 10 is thus supported, as shown in FIG. 3, the cable hook 17 can be disconnected from the eye 18 and the conveyor section 14 can be unfolded about the hinge connection 22 between the conveyor sections 13 and 14 and the cable hook 17 connected to a sling 25 transversely disposed of the conveyor 10 and attached at its ends to a pair of sidelugs 26. The extended conveyor can then be raised slightly to permit sections 13 and 14 to be secured together by means of cooperating latch and pin elements 23 and 24 provided at each side of the conveyor 10. When this has been accomplished the dump truck 11 can be tilted to a discharge position and the winch 15 can be used to raise and lower the conveyor 10 as shown in FIG. 2. The cable 16 provides a support means for the conveyor, and the hitch 12 provides a means of articulating the conveyor 10 as will be described.

As best shown in FIGS. 3 and 5, the conveyor 10 includes a continuous belt 30 having the upper length supported by dished sheet metal plates 31 and 32 extending between the side frames 33 and 34 of the conveyor sections 13 and 14. A drive roller assembly 35 is provided at the hitch end of the conveyor (FIG. 5) and an adjustable end roller 36 is provided at the outer end (FIG. 3). An intermediate roller assembly 37 and an individual roller 38 ensure that conveyor inner and outer sections 13 and 14 can be readily folded and unfolded. A hopper 40 is provided at the hitch end of the conveyor 10 (FIG. 5) and said hopper 40 is positioned to receive material, such as gravel, from a hatch 41, provided in the dump truck end wall 39, when the conveyor 10 is disposed in an operative extended condition relative to the tilted dump truck 11, as shown in FIG. 2.

Importantly, the hitch 12 provides a means of angling the conveyor 10 to the side so that the receiving hopper 40 remains located generally underneath the discharge hatch 41. In addition, the hitch 12 permits the conveyor 10 to rotate about its own longitudinal axis relative to the truck 11 so that the conveying surface of the conveyor belt 30 can be maintained in a generally horizontal plane even though the truck bed is laterally tilted. This tilting can occur, for example, when the wheels at each side of the truck are not at the same elevation because the truck is parked on a slope, and this is a common problem on building sites where the ground frequently tends to be uneven, particularly during the initial phases of construction.

Referring now more specifically to the hitch construction and with particular reference to FIGS. 5–9, it will be understood that the conveyor 10 and the truck 11 each include a hitch attachment means. In the case of the conveyor 10, see FIGS. 5 and 6, a fixed, rigid end plate 42 is provided having a stud 43 attached thereto as by welding. In the case of the truck 11 as best shown in FIGS. 7–9 a crossmember 44 is provided which extends between the longitudinal chassis members 45 and is welded thereto. The crossmember 44 includes an inverted trough-shaped member 46 having side portions 47, and also includes spaced upper and lower apertures 48 and 49 which are aligned to receive a hitch bolt 50.

The hitch 12 includes a pair of hingedly connected hitch plates 51 and 52 constituting first and second hinge plate means. As shown in FIGS. 5 and 6, plate 51 is apertured at 53 to receive the stud 43 of the conveyor end plate 42. The hinge plate 51 is connected to the conveyor end plate 42 by a nut 54 having a cranked handle 55 attached thereto and friction means, eg. washer 58 is disposed between the nut 54 and the conveyor end plate 42 to provide a means holding the hinge plate 51 and end plate 42 in a position of relative rotation. For more positive holding of the plates 51 and 42 in specific positions, a plurality of apertures 56 is provided in the end plate 42 and a single aperture 57 provided in hinge plate 51 which, when aligned with one of said apertures 56, can be held by means of a pin 60 within said aligned apertures, said pin 60 being attached to plate 51 as by a chain 61. To facilitate connection between hinge plates 51 and 52, plate 51 includes a plurality of apertured lugs 62. As shown in FIGS. 5 and 7 plate 52 includes a hinge pin 64 welded, or otherwise attached thereto, which is received in journal relation by said lugs 62. Hinge plate 51 is provided with stiffeners 65 below the lugs 62 in order to strengthen the connection. The hinge plate 52 is substantially semi-circular in configuration and includes a plurality of arcuately disposed apertures 67 disposed about a center aperture 66.

Importantly, see FIGS. 5 and 7, the hitch 12 includes a link member 70 constituting a link menas, said link member 70 having a lower element 72 and a cranked upper element 71. The link member 70 includes aligned apertures 73 at one end, which define a first pivot axis, and is pivotally connected to the hinge plate 52 by a pivot bolt 74 which extends through said apertures 73, and through the said hinge plate center aperture 66 and provides a first pivot means. At the other end the link member 70 includes aligned apertures 75, which define a second pivot axis parallel to said first pivot axis, and is pivotally connected to the crossmember 44 by means of the hitch pivot pin 50 which extends through said apertures 75 and through associated apertures 48 and 49 in said crossmember 44 to provide a second pivot means. Intermediate its ends the link member 70 includes aligned apertures 77 which are selectively disposed in register with apertures 67 to receive a removable locking pin 80 constituting a locking means. The pin 80 cooperates with pin 74 to provide a couple connection which effectively fixes the link member 70 to the hinge plate 52 at a desired rotational relationship. This hitch connection permits the conveyor 10 to be first angled relative to the truck 11 and then to be articulated laterally by the link member 70 so that the conveyor hopper 40 is positioned substantially directly below the hatch 41. This arrangement is clearly shown by reference to FIGS. 7 and 8 which illustrate the relative position of the superjacent hatch 41 in phantom outline indicated by numeral 141. It will be understood that the side portions 47 of the truck crossmember 44 constitute stop means which limit the rotational movement of the link member 70 about hitch pin 50 connecting the link member 70 to the crossmember 44 at the second pivot axis of said link member 70.

It is thought that the structural features and functional advantages of this conveyor hitch have become fully apparent from the foregoing description of parts but for completeness of disclosure the operation will be briefly described.

Figure 4:
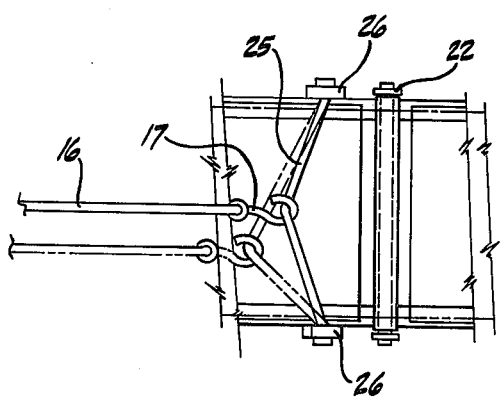
FIG. 4 is a fragmentary plan view illustrating the winch cable attachment to the conveyor.

The conveyor is transported in the raised, folded position shown in FIG. 1 and is held in that position by the winch cable 16. When it is desired to use the conveyor the winch 15 is actuated by a switch (not shown) located at the rear of the truck and the conveyor lowered until the foot 21 engages the ground as shown in FIG. 3 at which time the cable is released from the eye 17 and the outer portion 14 of the conveyor unfolded, and the cable 16 attached to the sling 25 as shown in FIG. 4. When the conveyor outer portion 14 is fully unfolded it can be latched to the inner portion by raising the conveyor slightly. When this has been accomplished the conveyor 10 can be raised and lowered by the winch about a hinge axis 20 defined by the hitch hinge pin 64. The winch 15 can then be actuated to raise the conveyor to the position shown in phantom outline in FIG. 2 so that when the truck is tilted the conveyor is lowered to the full line position shown in FIG. 2. As a practical matter the winch actuating switch (not shown) is located at the rear of the truck 11 in the vicinity of the truck tilting switch (not shown) so that the winch actuation and the tilting actuation can be accomplished by a single operator. The conveyor 10 can thereby be moved to a desired inclination above or below the horizontal by actuating the two switches at the same time. It will be understood that when the truck bed achieves a sufficient angle of tilt the material is dispensed from the hatch 41 to fall into the hopper 40 at the hitch end of the conveyor 10 and when the conveyor drive mechanism is actuated the material is conveyed to the end of the conveyor 10 and deposited.

When it is desired to angle the conveyor laterally, see FIGS. 7 and 8, the locking pin 80 is removed from the link member 70 and hinge plate 51 so that the conveyor 10 can pivot about pivot bolt 74. When the desired angle is achieved the locking pin 80 is inserted into the apertures 67 corresponding to that angle. Because of the provision of the link member 70 and the connection thereof to the crossmember 44, the link member 70 together with the relatively fixed conveyor 10 can be laterally shifted in the opposite direction within a range determined by the limits defined by the side portions 47 of the crossmember upper plate 46. Because of this compensatory articulation the relative position of the hatch 41, indicated by numeral 141, remains within the material catchment area defined by the hopper 40 and there is no spillage of material outside of said hopper. Thus, the structural arrangement of the link member 70 and the hinge plate 51 permits sideways movement of the conveyor 10 as well as the pivoting of said conveyor.

When it is desired to tilt the conveyor 10 laterally about its own longitudinal axis, defined by the pivot stud connection 43, the handle 55 (FIG. 4) is released to permit relative axial rotation of the conveyor 10. When the desired angle has been achieved the handle 55 is again tightened to hold the conveyor in place. A predetermined angle of tilt can be achieved, when necessary, by means of the locking pin 60 which is inserted within one of a plurality of arcuately disposed apertures 56. As shown in FIG. 4 the lateral position of the cable 16 is adjustable relative to the sling 25, to avoid positive twist on the conveyor 10, and to cooperate with the pivot stud 43 in holding the conveyor 10 at the desired lateral tilt angle about its own longitudinal axis.

It will be readily understood that when the conveying operation is completed the conveyor 10 should be angled to its neutral position in which it is longitudinally aligned with the truck 11 before being folded and raised for transportation to a different jobsite.

I claim as my invention:

1. In a dump truck and portable conveyor combination:
    a. a portable conveyor including a hitch attachment means defining a longitudinal pivot axis,
    b. a dump truck including a hitch attachment means defining a generally vertical pivot axis,
    c. support means supporting the conveyor,
    d. hitch means including:
        1. first and second hingedly connected hinge plate means,
        2. pivot means connecting said first hinge plate means to the conveyor hitch attachment means for rotational movement of the conveyor about said longitudinal pivot axis thereof,
        3. link means extending between said second hinge plate means and the truck hitch attachment means, said link means including substantially parallel first and second spaced pivot axes,
        4. first pivot means connecting said link means to said second hinge plate means for rotational movement of said second hinge plate means and said conveyor relative to the link means about the first pivot axis,
        5. second pivot means connecting said link means to said dump truck hitch attachment means for rotational movement of said link means relative to said truck hitch attachment means about said second pivot axis, and
        6. the second pivot means permitting lateral shifting of the first pivot means tending to compensate for lateral movement of points on the conveyor spaced from said first pivot means when the conveyor rotates about said first pivot axis.

2. A combination as defined in claim 1, in which:
    e. locking means selectively locks said first hinge plate means against rotation relative to the conveyor about the pivot means connecting said first hinge plate means to said conveyor hitch attachment means.

3. A combination as defined in claim 2, in which:
   f. said pivot means connecting said first hinge plate means to said conveyor hitch attachment means includes a friction fastener means, and
   g. said locking means is provided at least in part by said friction fastener means.

4. A combination as defined in claim 2, in which:
   f. said conveyor hitch attachment means includes an end plate means disposed in face-to-face relation with said first hinge plate means,
   g. said pivot means includes a fastener means extending between said end plate means and said first hinge plate means,
   h. one of said latter two plate means includes a plurality of apertures arcuately disposed about said pivot means, and
   i. said locking means includes a locking pin extending from the other of said latter two plate means and being selectively received within one of said apertures.

5. In a dump truck and portable conveyor combination:
   a. a portable conveyor including a hitch attachment means providing an end plate defining a longitudinal pivot axis, and including a hopper in the vicinity of the hitch attachment means,
   b. a dump truck including a hitch attachment means defining a generally vertical pivot axis, and including a rear wall having a discharge hatch therein disposed above the conveyor hopper to deposit material therein,
   c. hitch means including:
      1. a flexible tension element extending between the truck and the conveyor to support said conveyor,
      2. first and second hingedly connected hinge plates having a hinge axis transversely disposed of the conveyor longitudinal axis,
      3. pivot and holding means connecting the first hinge plate to the conveyor end plate for rotational movement of the conveyor about the longitudinal pivot axis thereof and selectively holding the first hinge plate to the conveyor end plate at a selected angle of relative rotation of the conveyor,
      4. a link member extending between the second hinge plate and the truck hitch attachment means including substantially parallel first and second spaced pivot axes,
      5. first link pivot means longitudinally spaced from the hopper and connecting said link member to the second hinge plate for rotational movement of said second hinge plate and said conveyor relative to the link member about the first pivot axis,
      6. second link pivot means connecting said link member to said dump truck hitch attachment means for rotational movement of said link member relative to said truck hitch attachment means about said second pivot axis,
      7. said second pivot means permitting lateral shifting of the first pivot means tending to compensate for lateral movement of the hopper away from the hatch when the conveyor rotates about the first pivot axis, and
      8. locking means selectively locking said link member against relative rotational movement about at least one of said pivot axes.

6. A combination as defined in claim 5, in which:
   d. said second hinge plate includes a plurality of apertures disposed in arcuate relation about said first link pivot axis,
   e. said locking means includes a locking pin carried by said link member and engageable within one of said apertures and cooperating with said first link pivot means to provide a couple precluding said relative rotation of said link member and said second hinge plate, and
   f. said truck hitch attachment means includes stop means spaced from said second link pivot axis and engageable with said link member to limit rotation of said link member about said second link pivot axis.

7. A combination as defined in claim 5, in which:
   e. said pivot and holding means connecting the first hinge plate to the conveyor end plate includes a sling transversely disposed across the conveyor and providing a laterally variable point of connection for the flexible tension element to hold said conveyor at said selected angle of relative rotation.

* * * * *